United States Patent [19]

Orlowski

[11] Patent Number: 4,832,350

[45] Date of Patent: May 23, 1989

[54] ONE PIECE LABYRINTH SEAL

[76] Inventor: David C. Orlowski, 3407 78th Ave. West, Rock Island, Ill. 61201

[21] Appl. No.: 135,698

[22] Filed: Dec. 21, 1987

[51] Int. Cl.[4] .............................................. F16J 15/54
[52] U.S. Cl. ......................................... 277/53; 277/24
[58] Field of Search ...................... 277/53, 56, 68, 24, 277/70; 384/480

[56] References Cited

U.S. PATENT DOCUMENTS

| 4,031,716 | 6/1977  | Zabcik    | 277/53 X  |
|-----------|---------|-----------|-----------|
| 4,139,203 | 2/1979  | Garrison  | 384/480 X |
| 4,257,617 | 3/1981  | Hill      | 277/53 X  |
| 4,373,759 | 2/1983  | Greener   | 384/480   |
| 4,406,463 | 9/1983  | Fabrowsky | 277/53    |
| 4,531,746 | 7/1985  | Amdall    | 277/53    |
| 4,572,517 | 2/1986  | Rockwood  | 277/53    |
| 4,706,968 | 11/1987 | Orlowski  | 277/53    |
| 4,743,034 | 5/1988  | Kakabaker | 277/53    |

Primary Examiner—Harvey C. Hornsby
Assistant Examiner—K. O'Leary
Attorney, Agent, or Firm—Y. Judd Azulay

[57] ABSTRACT

A mechanical seal for rotating shafts consisting of a single ring member. The ring member has a series of radial grooves in the internal bore and a trough extending across the grooves to an end of the ring. The ring also has at least one external labyrinth groove extending radially and serving to inhibit contamination. A collection chamber having an expulsion port lies between the inner radial grooves and the external labyrinth groove.

10 Claims, 1 Drawing Sheet

ONE PIECE LABYRINTH SEAL

BACKGROUND OF THE INVENTION

The present invention is deemed to be a considerable and meritorious improvement over the inventions disclosed in U.S. Pat. Nos. 4,022,479; 4,114,902; 4,175,752; 4,304,409; 4,466,620; and 4,706,968.

In many industries, it is extremely important to obtain a seal for rotating shafts emerging from a bearing and its housing which prevents the lubricants associated with the bearings from leaking externally of the associated housing or bearing support and for preventing contaminants in the environment from working themselves through the seal and into the lubricant for the bearings.

Various successful labyrinth bearing isolation devices exist in two-piece and three-piece combinations. Single-unit labyrinth sealing devices also exist. However, the single-unit labyrinth sealing devices are notoriously ineffective in dealing with contaminant intrusion, although they successfully retain lubricant.

U.S. Pat. No. 4,022,479 incorporates a disclosure wherein is taught a two-piece sealing ring structure which has an object elimination of the loss of lubricant from the bearings supporting a rotating shaft. The sealing ring structure disclosed also eliminates the movement of contaminants into the bearings and lubricant. Further disclosed in a sealing structure that is composed of two rings, preferably metal, one fixed to a housing and the other fixed to rotate with a shaft. The ring that is fixed to a housing has a labyrinth seal next to the shaft which prevents lubricant from moving outside of the housing along the shaft.

Also in U.S. Pat. No. 4,022,479, a joint is provided between the two rings which is an annular recess in the first ring and an annular flange on the second ring that fits within the annular recess of the first ring. The construction of the recess and the flange are complimentary, so that when one of the rings is rotating relative to the other, the seal will not bind or create heat by friction between them. There is also provided in the first ring member an elongated hole that communicates from the annular recess to the outside of the first ring member. In the embodiment taught in this prior patent, the annular flange of the sealing ring member has axial notches. By this means, foreign matter that migrates into the joint between the ring members is expelled from the seal. It may be noted that the second ring member is made to rotate with the shaft by suitable frictional sealing means. However, there is no rubbing, wear or contact between the sealing ring members.

The invention of U.S. Pat. No. 4,114,902 was an ingenious improvement over the device disclosed in U.S. Pat. No. 4,022,479. The improvement included one or more grooves on the outer periphery of the annular flange of the second ring member. Additionally, the accomodating recess in the other ring member also contained one or more grooves. It was also taught in U.S. Pat. No. 4,114,902 that these grooves inhibit contaminant migration, regardless of relative peripheral speed of the rotating rings and to provide a tortuous path for the exclusion of foreign material even in the event of zero relative rotation.

U.S. Pat. No. 4,175,752 disclosed a labyrinth seal comprising a single ring having both an annular gap and a primary drain. The uniqueness of the device consists in the addition of the annular gap; lubricant is prevented from migrating along the shaft for which it is used.

U.S. Pat. No. 4,304,409 disclosed an improved sealing assembly which is a liquid pressure differential seal useful with a bearing shaft and housing. The seal includes a multi-ring sealing structure fixed to the housing and between the shaft and the housing. The multi-ring structure is arranged so that a first (stator) ring is fixed to the bearing housing and a second (rotor) ring is fitted to the rotating shaft. The improvement comprises a pressure and self compensating sealing device positioned radially to the shaft. It consists of a cover and a support spring partially encapsulated by the cover.

The invention of U.S. Pat. No. 4,466,620 is a further ingenious improvement over the devices disclosed in the aforementioned patents and solves additional problems. The improvement, among other items, includes a modification of the drain hole in the first sealing ring. That hole was modified so that its length is greater than its width like an ellipse. This improvement eliminates expulsion problems which occasionally arise due to the minor relative axial displacement of the sealing rings when the drain hole is circular. It provides a more effective means to expell foreign matter from the annular recess (or recesses if more than one flange-recess combination is provided) at the interface of the sealing rings.

U.S. Pat. No. 4,466,620 also encompassed an additional improvement wherein a portion of the first ring member that faces towards the bearing located inside its housing is extended to form a shielding protrusion. This improvement keeps off the liquid lubricant that is continuously thrown at the first ring member in certain applications, e.g. multiple gear and pinion speed reduction gearing.

U.S. Pat. No. 4,706,968 is a further unique and ingenious improvement over other labyrinth seal devices in having a third ring member which is located between the interface of the first stationary ring member and the second rotary ring member in complimentary recesses in the first ring member and the second ring member.

All of the above two and three piece labyrinth seals have universal applicability but require custom manufacture and so tend to be expensive. Thus, while being widely acknowledged and accepted, there remains some hesitancy in many companies to use them. Further, with the prevalence of inexpensive rubber or synthetic lip (contact) type seals, many companies prefer not to use the aforementioned labyrinth seals. Unfortunately, rubber or synthetic rubber lip seals must be replaced frequently and are notoriously ineffective in retaining lubricant and in dealing with contaminant intrusion.

The above identified two and three piece labyrinth seals are advances which have solved a large number of problems. However, certain problems are still encountered in various particular work applications. Problems remain in cases where a large amount of lubricant splash is encountered, thus necessitating increased radial clearances on the inside surface of the rotor insertion. Further problems are encountered in cases where axial shaft movement (oscillation) occurs, as in sleeve bearing electric motors. Axial separation of the two and three piece seal components is thereby possible.

Accordingly, it would be highly desireable to have a sealing ring structure that is inexpensive, compact in design, will successfully retain lubricant within the bearing, will not require a cartridge configuration to accomodate axial shaft movement, would not have a pumping tendancy, will prevent contaminant intrusion and will have a broad range of applications.

SUMMARY OF THE INVENTION

The object of the invention is to provide a seal around rotating shafts and their housings to prevent leakage of lubricants and to prevent the entry of contaminants into the shaft housings by the ingenious use of a one piece labyrinth lubricant inclusion contaminant exclusion device in which contaminant exclusion capability is external of the bearing housing.

Generally two-piece labyrinth mechanical seals depend for efficacy upon a tortuous path, through which the migration of lubricating fluid or contaminants is virtually impossible. Commonly, one part of the mechanical labyrinth seal is affixed to the shaft and one part of the seal is affixed to the housing over which a seal is sought to be obtained. The interface, or point of mesh, between the two parts of the mechanical seal is often designed to provide a labyrinth or tortuous path at that point of close proximity with the object of attaining a seal.

This invention is an entirely new development over the art of two or more piece labyrinth mechanical seals. This invention introduces a one piece labyrinth lubricant inclusion/contaminant exclusion seal which performs as well, in most cases, as a two piece labyrinth seal.

The invention consists of a labyrinth mechanical seal having only one ring.

The seal, stationary to the housing is identified by a first series of inner radial grooves in its bore, at least one external labyrinth groove, a collection chamber having an expulsion port lying between the series of inner radial grooves and the external labyrinth groove, an o-ring or other means on the seal outer periphery allowing it to be fixed to the shaft housing and a shoulder also on the outer periphery to provide a stop when the ring member is fitted into the shaft housing. The first series of radial grooves in the bore of the ring is connected by a groove or trough across the bottom, sloping downward to provide a drain.

The ring also provides a labyrinth path to inhibit contaminant from entering into the outer collection chamber by having at least one annular recess (contaminant inhibiting labyrinth groove) also in the bore spaced away from the first series of radial grooves. The first series of inner radial grooves and the external labyrinth groove, in combination, provide a more effective seal by inhibiting contaminant passage into the internal structure. Virtually all matter making its way into either set of grooves will be expelled by rotary motion of the shaft or by gravity when the shaft is static.

This invention is unique and ingenious for the concept of introducing a contaminant collection chamber at a point between the first series of radial grooves and the external labyrinth groove. The rotating shaft acts as a rotor, impelling contamination into the collection chamber. From the collection chamber the contaminant is expelled or drained through an expulsion port at the lowest surface of the collection chamber.

DESCRIPTION OF THE PREFERRED EMBODIMENT

Figure 1:
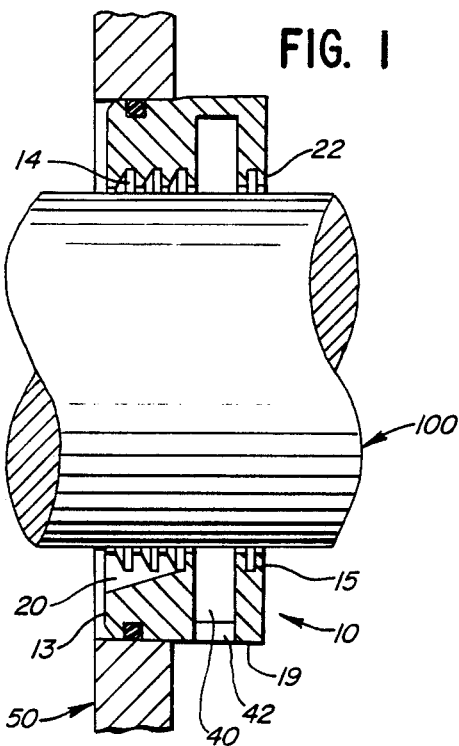
FIG. 1 is a vertical sectional view showing the sealing structure with a shaft.
Figure 2:
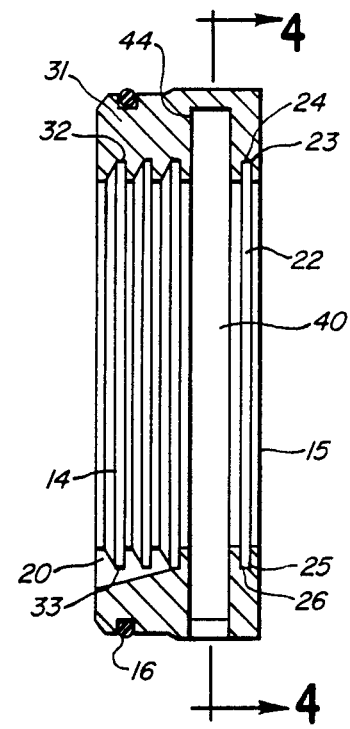
FIG. 2 is a vertical sectional view showing the sealing structure.
Figure 4:
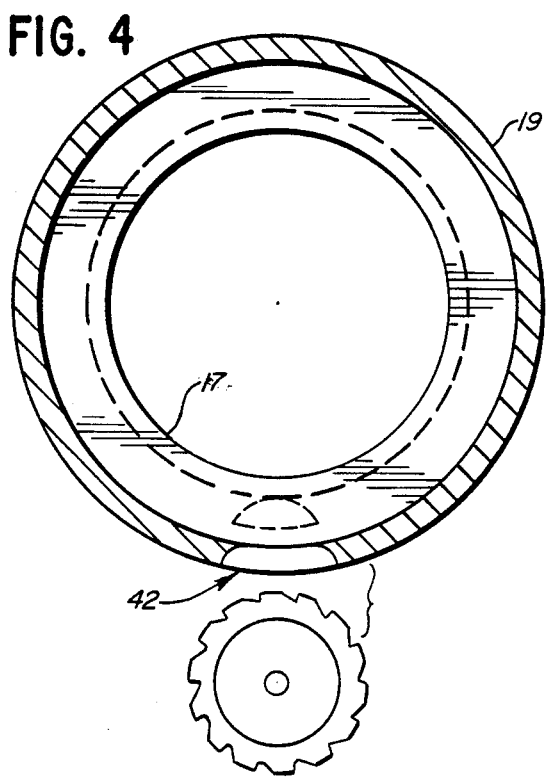
FIG. 4 is a cross sectional view of the seal taken on line 4—4 of FIG. 2.
Figure 3:
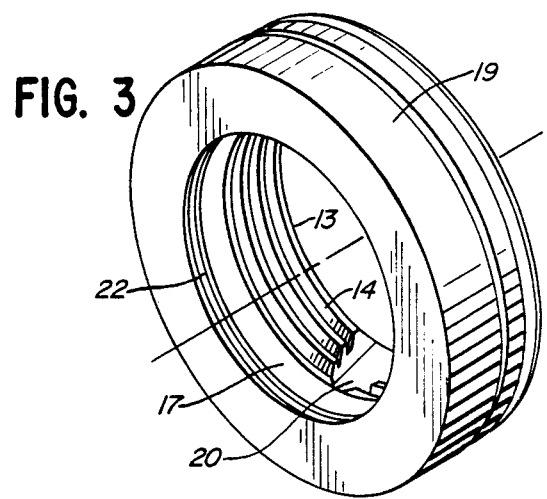
FIG. 3 is a perspective view of the sealing ring of the present invention.

Referring first to FIG. 1, there is shown an arrangment in which the sealing structure of the present invention may be employed. There is shown the sealing ring of the present invention 10 in vertical crossection mounted on a shaft 100. The shaft extends through a bearing housing 50. Sleeve type bearings, pillow block bearings, journal bearings or rolling element bearings are conventionally fitted to the shaft 100. Conventional means are provided to provide lubricant to the race. More details of this feature can be discerned from the aforementioned U.S. Pat. No. 4,022,479 of which parts are herein incorporated by reference.

In order to prevent leakage of the lubricant from inside the housing 50 outwardly and the egress of contaminant material from outside the housing into the bearings or lubricant, there is provided a sealing ring structure 10 consisting of a single ring described henceforth also as 10. The ring 10 has an external radially extending face or first end 13, facing internally to the fixed housing, an internal radially extending face or second end 15, facing externally to the fixed housing, an inner axially extending face 17, and an outer axially extending face 19. The ring 10 also possesses an external annular groove in which seats a conventional o-ring 16 that bears against the inner diameter of a complimentary circular opening in the housing 50. The ring 10 may be secured with respect to the housing 50 by a wedge fit with respect thereto. Radial grooves 14 are provided on the inner axially extending face 17 of the ring 10 and provide radial shoulders which engage lubricant tending to move axially outwardly along the shaft portion 100 and to guide it into an axially extending groove or trough 20 on the inside of the ring 10. The trough 20 joins the inner radial grooves 14 and leads back into the housing 50 to provide a drain. The optimum radial clearance between the shaft 100 and inner radial grooves 14 is 0.0006 to 0.017 inches.

The second end 15 of the ring 10 is provided with at least one external labyrinth groove 22 that extends radially and serves to inhibit contaminant passage into the internal structure. The optimum radial clearance between the shaft 100 and the outer contaminant inhibiting groove 22 is 0.005". However, the radial clearance may range from 0.002" to 0.010". To structurally inhibit axial flow along the shaft, the outer surface must be radially close to shaft 100.

All corners 23, 24, 25, 26 of the external labyrinth groove 22 and all inside corners 30, 31, 32, 33, 34, 35 of the inner radial grooves 14 are sharp and unbroken to increase flow resistance and thus prevent fluid flow across such corners. The sharp unbroken corners are all set at exactly ninety (90) degree angles. The outside corners may be broken, as is good machining practice.

As can be seen in FIG. 1, the shaft 100 acts as a rotor, impelling comtamination into collection chamber 40. The collection chamber 40 lies between external labyrinth groove 22 and inner radial groove 14. In addition, the collection chamber 40 has an expulsion port 42 through the external surface of the ring 10. The use of such a collection chamber 40 with the expulsion port 42 allows this seal to maintain contaminant exclusion external to the bearing housing. Virtually all matter making its way through either external labyrinth groove 22 and toward inner radial grooves 14 will be expelled by rotary motion of shaft 100, or by gravity when the shaft 100 is static. The optimum axial width of the external collection chamber 40 is 0.250". The width may range from 0.125" to 0.750".

Figure 5:
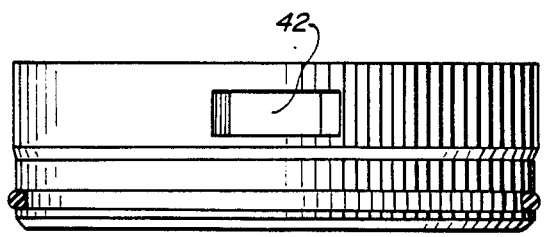
FIG. 5 is a bottom view of the seal.

As will be noted from FIG. 5, the expulsion port 42 has a circumferentially extending width greater than its axially extending length. This preferred embodiment allows the seal to effectively deal with contaminant intrusion. Thus, such a seal can be used for a broad range of applications including pillow block bearings, motor shafts, medium duty pumps, etc.

The ring 10 also includes shoulder means 44 on its outer axially extending face 19. The shoulder means or incline 44 limits the depth to which said ring member may be inserted into housing 50.

The incline 44, depending on the housing, may be 5 degrees to 20 degrees from the axis of the ring member. Optimally, the incline 44 is 15 degrees. Further, the incline 44 permits the seal 10 to orient to the axis of the shaft, rather than conforming to the orientation of the housing.

The incline 44 is made steep enough to limit the axial positioning inward to the housing and shallow enough so angular orientation of the entire seal is kept to the axis of the shaft.

Due to the fact that the seal is made of only one ring, clearances between complementary parts need not be of concern. Thus, the seal can be made easily of any exotic metal, standard bronze and common metals. In addition any suitable non-metallic material such as engineering plastics, commercial PVC or fiber can be used for this seal.

Since this is a compact one piece bearing seal, problems previously encountered with axial and radial space limitations are overcome. Most importantly, the wear problems usually associated with rubber lip seals are also overcome.

As was mentioned in the issued patents, that while o-rings are provided for seals, there is little or no relative rotation between the sealing surfaces and the o-rings. Therefore, the o-rings should not wear and the possibility of breaking the seal is remote.

Based on this disclosure, many other modifications and ramifications will naturally suggest themselves to those skilled in the art. These are intended to be comprehended within the scope of this invention.

I claim:

1. A seal between a fixed housing and a rotating shaft comprising:
   a. a single ring member stationary to the housing having a first end facing internally to the fixed housing and a second end facing externally of said housing,
   b. said ring member having at said first end a series of radial grooves in the internal bore of said ring member with said radial grooves disposed adjacent to the shaft with a trough extending across said radial grooves to the first end of said first member as a drain,
   c. said ring member having at said second end at least one external labyrinth groove extending radially within said internal bore,
   d. said ring member also having a contaminant collection chamber having an expulsion port in said external surface of said ring, and
   e. said contaminant collection chamber being located between said series of radial grooves at said first end and said external labyrinth groove at said second end.

2. The seal of claim 1 having shoulder means on the circumference of said ring member in contact with said fixed housing whereby said shoulder means limits the depth to which said ring mamber may be inserted into the fixed housing by a circumferential incline.

3. The seal of claim 3 wherein said shoulder means is an incline of from 5 to 20 degrees from the horizontal.

4. The seal of claim 1 wherein said expulsion port is located at the lower surface of said collection chamber in said ring member providing a port for the expulsion of contaminants external to the bearing housing.

5. The seal of claim 1 wherein said expulsion port has a circumferentially extending width greater than its axially extending length.

6. The seal of claim 1 wherein said ring member is comprised of fiber, plastic, wood or some suitable non-metallic material.

7. The seal of claim 1 wherein said ring member is comprised of some suitable metallic material.

8. The seal of claim 1 wherein all inside corners on said radial grooves at said first end and said external labyrinth groove at said second end are sharp and unbroken and set at exactly ninety (90) degrees.

9. The seal of claim 1 wherein the axial width of the collection chamber is from 0.125" to 0.750".

10. The seal of claim 1 wherein the radial clearance between the inner surface of the external labyrinth groove and the shaft is between 0.002" and 0.010".

* * * * *